United States Patent
Kouridakis et al.

(10) Patent No.: US 10,917,779 B2
(45) Date of Patent: Feb. 9, 2021

(54) USER EQUIPMENT REGISTRATION REDISTRIBUTION IN A MSC POOL

(71) Applicant: Telefonaktiebolaget LM Ericsson (publ), Stockholm (SE)

(72) Inventors: Kostas Kouridakis, Athens (GR); Florin Alexandru Deaconu, Eschweiler (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/734,722

(22) Filed: Jan. 6, 2020

(65) Prior Publication Data

US 2020/0162887 A1 May 21, 2020

Related U.S. Application Data

(63) Continuation of application No. 14/772,979, filed as application No. PCT/EP2015/056267 on Mar. 24, 2015, now Pat. No. 10,536,839.

(51) Int. Cl.
*H04W 8/06* (2009.01)

(52) U.S. Cl.
CPC ................... *H04W 8/065* (2013.01)

(58) Field of Classification Search
CPC ..... H04W 24/02; H04W 76/25; H04W 16/18; H04W 28/08; H04W 48/02; H04W 48/18; H04W 76/10; H04W 76/11; H04W 8/06; H04W 8/10

See application file for complete search history.

(56) References Cited

U.S. PATENT DOCUMENTS

| | | | |
|---|---|---|---|
| 2004/0248592 A1* | 12/2004 | Turina | H04W 24/02 455/461 |
| 2011/0117946 A1 | 5/2011 | Vainola et al. | |
| 2014/0347990 A1* | 11/2014 | Chimbili | H04W 76/00 370/235 |

FOREIGN PATENT DOCUMENTS

| | | |
|---|---|---|
| EP | 2063660 A1 | 5/2009 |
| WO | 2005064954 A1 | 7/2005 |

OTHER PUBLICATIONS

Huawei, "MS Re-distribution via Gs Interface", 3GPP TSG-SA WG2 Meeting #48, Sep. 5-9, 2005, pp. 1-6, Sophia-Antipolis, FR, Tdoc S2-052144.
3rd Generation Partnership Project, Technical Specification Group Services and System Aspects; Intra-domain connection of Radio Access Network (RAN) nodes to multiple Core Network (CN) nodes (Release 12), 3GPP TS 23.236 V12.0.0, Jun. 2013, pp. 1-40.

* cited by examiner

*Primary Examiner* — Kwasi Karikari
(74) *Attorney, Agent, or Firm* — Coats + Bennett, PLLC

(57) ABSTRACT

A system, methods, nodes and computer program for redistributing a registration of a UE from a first MSC to a second MSC is provided. The first MSC and the second MSCs are members of a pool of MSCs. The UE is registered in the first MSC and is attached to the first MSC via a packet control node such as MME or SGSN. The first MSC receives an order from an O&M center to redistribute the registrations of UEs in the pool. The first MSC sends a redistribution order to the packet control node. The packet control node triggers the UE to perform a routing or tracking area update procedure and triggers a location area update procedure to the second MSC, causing the UE to be registered to the second MSC.

24 Claims, 7 Drawing Sheets

USER EQUIPMENT REGISTRATION REDISTRIBUTION IN A MSC POOL

RELATED APPLICATIONS

The present application is a continuation of U.S. patent application Ser. No. 14/772,979, which was filed on Sep. 4, 2015, which is a national stage application of PCT/EP2015/056267, filed Mar. 24, 2015, the disclosures of each of which are incorporated herein by reference in their entirety.

TECHNICAL FIELD

The present invention relates to telecommunications and in particular to a system, methods, nodes and computer program for redistribution of a user equipment registration in a MSC pool.

BACKGROUND

The MSC (Mobile Switching Center) pool is a group of MSC nodes sharing in parallel the traffic generated from one and only one MSC pool area. BSC (Base Station Controller) or RNC (Radio Network Controller) radio access nodes belonging to an MSC pool area are connected to all the MSCs of the MSC pool.

When partial or full traffic load removal is needed in a MSC node, e.g. when to perform scheduled maintenance or when to perform load redistribution among the MSC pool members, the MSC Pool Redistribution function can be used. This minimizes traffic disturbances, e.g. during the maintenance work of the MSC.

The MSC Pool Redistribution function can also be used to quickly redistribute UE (user equipment) registration in order to balance the traffic load in the MSC pool when a new MSC or BSC/RNC node is added to or removed from the MSC pool.

MSC Pool Redistribution allows moving UE registrations from an MSC belonging to a pool to any other or to a specified target MSC pool member. The operator can specify the percentage of the UE registrations to be redistributed to any other or to a specific target MSC pool member.

If MSC Pool redistribution is ordered for a number of UE registrations, the MSC selects the UE registrations that are to be redistributed to other MSCs of the pool. The selection avoids selecting only subscribers that were more active than others.

FIG. 2 shows the prior art signaling sequence for redistributing a number of UE (100) registrations registered in MSC 1 (120) by showing the example of moving a single UE (100) registration to MSC 2 (124), where MSC 1 (120) and MSC 2 (124) are both members of the same pool of MSCs (130). The following steps are performed:

The operator initiates the procedure by issuing an O&M (operation and maintenance) instruction to redistribute UE 100 registrations. The MSC 1 120 selects the UE 100 registrations to be redistributed.

A UE 100 is performing a location update procedure, or initiates an originating call or a short message.

The BSC/RNC 110 identifies the handling MSC 1 120 using the NRI (network resource indicator) part of the TMSI (Temporary Mobile Subscriber Identity) contained in the received message.

The BSC/RNC 110 routes the message to the MSC 1 120.

MSC 1 120 checks if this UE 100 registration is marked for redistribution to another MSC 122, 124 of the pool of MSCs 130.

In case the UE 100 registration is marked for redistribution, then MSC 1 120 initiates TMSI reallocation using a Null-NRI in the new TMSI. The TMSI reallocation comprises also a non-broadcast LAI (Location Area Identity).

Each MSC in a pool 130 has assigned one unique non-broadcast LAI that it uses in case it wants to be offloaded. Each MSC in the pool 130 has to be aware of the non-broadcast LAI/RAI assigned to the other MSCs in the pool, because in case of redistribution, the target MSC will retrieve data (e.g. IMSI, security context, mobility context) from the offloaded MSC based on non-broadcast LAI.

Location Update Accept is send to the UE 100 from the MSC 1 120.

The UE 100 performs a new location update using the newly allocated TMSI containing the Null-NRI.

The BSC/RNC 110 does not recognize the Null-NRI and derives that a new MSC 122, 124 shall be selected from the pool of MSCs 130, using a selection logic for a new subscriber. The MSC 1 120, that is on redistribution, is blocked for new UE 100 registrations in the BSC/RNC distribution function. In this scenario, the BSC/RNC 110 selects MSC 3 124.

The BSC/RNC 110 sends the Location Update message to the MSC 3 124. MSC 3 124 registers the UE 100.

MSC 3 124 performs TMSI reallocation using its own NRI. Then MSC 3 124 contacts the HLR 150 (Home Location Register) and a Cancel Location procedure initiated from HLR 150 removes the UE 100 registration from the MSC 1 120 (not depicted in the figure).

MSC 2 120 sends Location Update message to the UE 100. Redistribution is finished and UE 100 registration is redistributed to MSC 3 124 of the pool.

However, UEs 100 can be attached to a MSC 120 not only via a BSC/RNC 110 radio access node, but also via a packet based radio interface. In this case the UE 100 is attached to the MSC 120 via a SGSN (Serving Gateway Support Node) or MME (Mobility Management Entity) packet node 140.

For the time being SGs (SGs-interface between a MME and a MSC) or Gs (Gs-interface between a SGSN and a MSC)-attached subscribers are not considered in the standard UE registration redistribution mechanism. In the prior art mechanism SGs/Gs-attached UEs cannot be selected, so these UEs cannot be redistributed to another MSC of the pool.

This implies that today it is impossible to completely offload a MSC, since the SGs/Gs-attached subscribers will remain registered in the MSC. With the strong trend towards LTE (Long Term Evolution) radio using the SGs attachment to the MSC, more and more subscribers will be attached to the MSC via SGs/Gs-interface. So this problem increases significantly, rendering the standard UE registration redistribution function useless.

SUMMARY

There is a clear need for an improved UE registration redistribution function in a MSC pool, taking also into account UEs attached via SGs/Gs-interface.

It is an object of the present invention to improve the redistribution of UE registrations in a pool of MSCs. This object is achieved by the independent claims. Advantageous embodiments are described in the dependent claims.

According to an exemplary aspect of the invention, a method for redistributing a registration of a user equipment from a first MSC to a second MSC is provided. The first MSC and the second MSC are members of a pool of MSCs and the user equipment is registered in the first MSC and is attached to the first MSC via a packet control node. The method comprises that the first MSC receives an instruction to redistribute user equipment registrations and sends a redistribution order to the packet control node. The method further comprises that the packet control triggers the user equipment to perform a routing or tracking area update procedure and triggers the user equipment to be registered to the second MSC.

According to another exemplary aspect of the invention, a method in a first MSC for redistributing a registration of a user equipment from the first MSC to a second MSC is provided. The first MSC and the second MSC are members of a pool of MSCs and the user equipment is registered in the first MSC and is attached to the first MSC via a packet control node. The method comprises to receive an instruction to redistribute user equipment registrations and to send a redistribution order to the packet control node.

According to another exemplary aspect of the invention, a method in a packet control node for redistributing a registration of a user equipment from a first MSC to a second MSC is provided. The first MSC and the second MSC are members of a pool of MSCs and the user equipment is registered in the first MSC and is attached to the first MSC via the packet control node. The method comprises to receive from the first MSC, a redistribution order to redistribute the registration of the user equipment. The method further comprises to trigger the user equipment to perform a routing or tracking area update procedure and to trigger the user equipment to be registered to the second MSC.

According to another exemplary aspect of the invention, a first MSC for redistributing a registration of a user equipment from the first MSC to a second MSC is provided. The first MSC and the second MSC are members of a pool of MSCs and the user equipment is registered in the first MSC and is attached to the first MSC via a packet control node. The first MSC comprises a receiving unit adapted to receive an instruction to redistribute user equipment registrations and a sending unit adapted to send a redistribution order to the packet control node.

According to another exemplary aspect of the invention, a packet control node for redistributing a registration of a user equipment from a first MSC to a second MSC is provided. The first MSC and the second MSC are members of a pool of MSCs and the user equipment is registered in the first MSC and is attached to the first MSC via the packet control node. The packet control node comprises a receiving unit adapted to receive, from the first MSC, a redistribution order to redistribute the registration of the user equipment. The packet control node further comprises a first trigger unit adapted to trigger the user equipment to perform a routing or tracking area update procedure, and a second trigger unit adapted to trigger the user equipment to be registered to the second MSC.

According to another exemplary aspect of the invention, a system for redistributing a registration of a user equipment from a first MSC to a second MSC is provided. The first MSC and the second MSC are members of a pool of MSCs and the user equipment is registered in the first MSC and is attached to the first MSC via a packet control node. The system comprises the first MSC, the second MSC, the packet control node, the user equipment, a Home Location Register, and an Operation and Maintenance Center.

As to a still further aspect, a computer program product is provided. The computer program product comprises program code portions for performing the steps of any one of above aspects, e.g., when the computer program product is executed on one or more computing devices. The computer program product may be provided on a computer-readable recording medium and/or for download onto such a computer-readable recording medium in a data network, e.g., the communications network and/or the Internet.

The foregoing and other objects, features and advantages of the present invention will become more apparent in the following detailed description of embodiments of the invention illustrated in the accompanying drawings.

BRIEF DESCRIPTION OF THE DRAWINGS

Further characteristics and advantages of the invention will become better apparent from the detailed description of particular but not exclusive embodiments, illustrated by way of non-limiting examples in the accompanying drawings, wherein.

DETAILED DESCRIPTION

Figure 1:
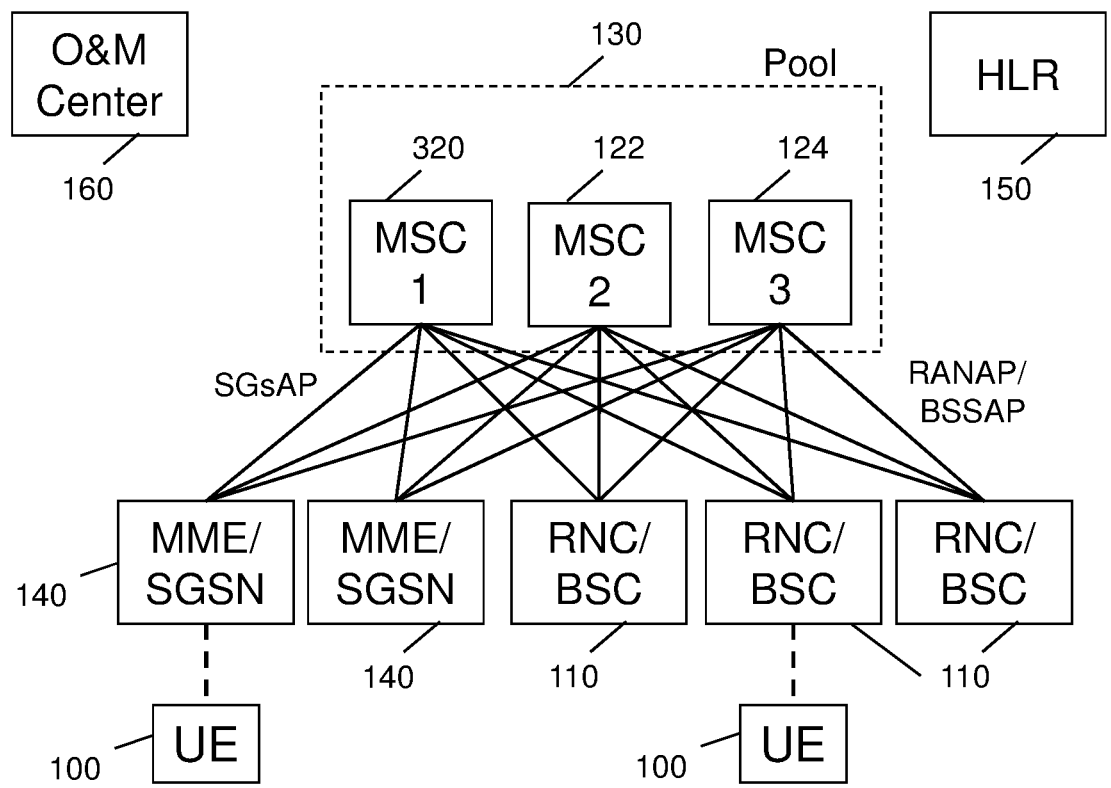
FIG. 1 show diagram illustrating a system for MSC in Pool, where a UE is attached to a MSC of the pool via a packet control node according to the invention.
Figure 2:
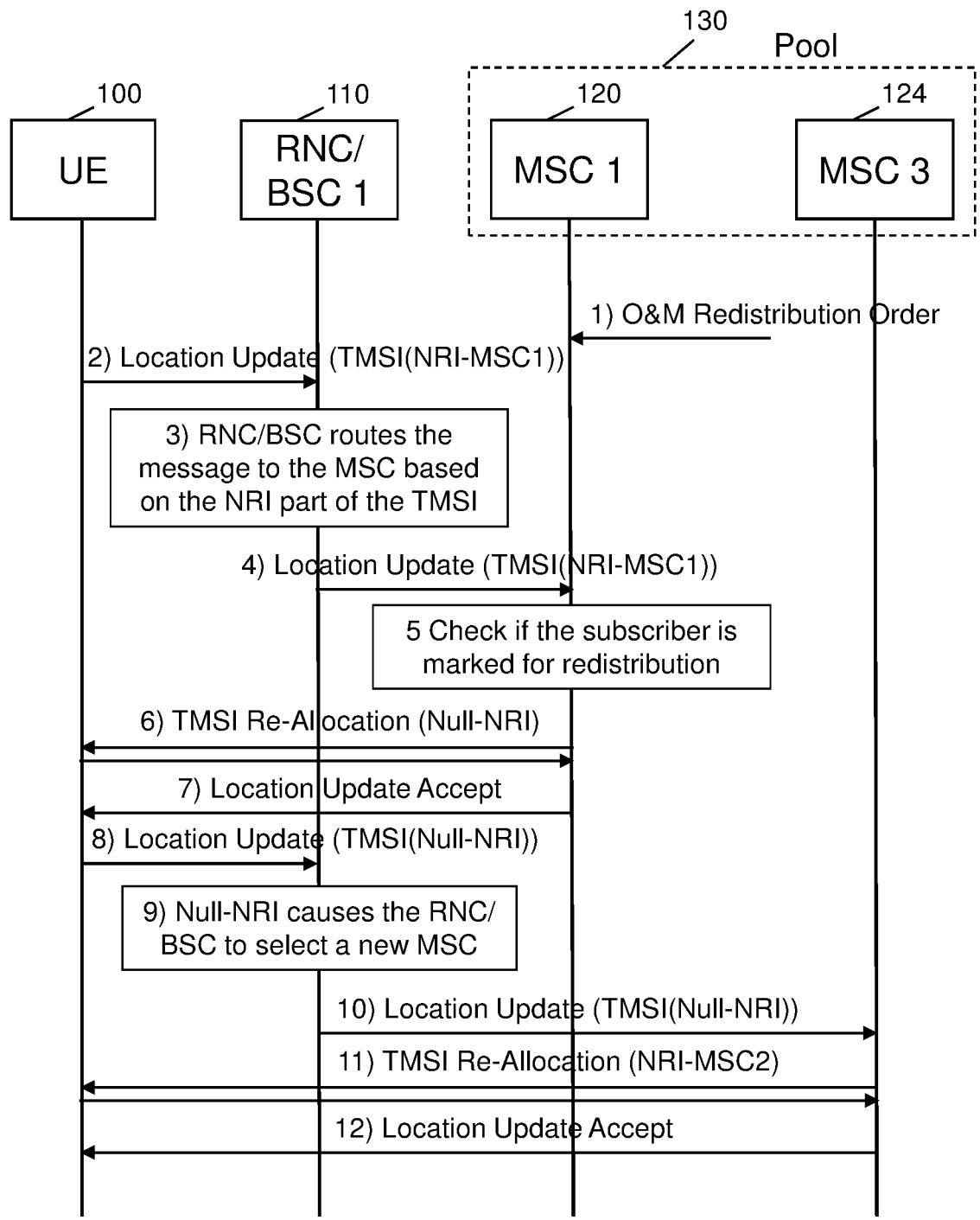
FIG. 2 shows a sequence diagram for redistribution of a UE registration, where the UE is attached to a MSC of the pool via a BSC/RNC access node according to prior art.

In the following, a system, methods, nodes, and computer programs for redistribution of a UE registration in a pool of MSCs according to the invention are described in more detail.

Within the context of the present application, the term "user equipment" (UE) refers to a device for instance used by a person for his or her personal communication. It can be a telephone type of device, for example a telephone or a SIP phone, cellular telephone, a mobile station, cordless phone, or a personal digital assistant type of device like laptop, notebook, notepad equipped with a wireless data connection. The UE may also be associated with non-humans like animals, plants, or even machines. A UE may be equipped with a SIM (Subscriber Identity Module) comprising unique identities such as IMSI (International Mobile Subscriber Identity) and/or TMSI (Temporary Mobile Subscriber Identity) associated with a subscriber using the UE. The presence of a SIM within a UE customizes the UE uniquely with a subscription of the subscriber.

Within the context of the present application, the term "communication network" or short "network" may particularly denote a collection of nodes or entities, related transport links, and associated management needed for running a service, for example a telephony service or a packet transport service. Depending on the service, different node types or entities may be utilized to realize the service. A network operator owns the communication network and offers the implemented services to its subscribers. Typical examples of a communication network are radio access network (such as 2G, GSM, 3G, WCDMA, CDMA, LTE, WLAN, Wi-Fi), mobile backhaul network, or core network such as IMS (IP Multimedia System), CS (Circuit Switched) Core, PS (Packet Switched) Core.

Within the context of the present application, the term "control node" refers to a node of the communication network primarily performing control procedures for sessions or calls and services of a subscriber of the communication network. The term typically refers to those entities of the communication network handling control plane, subscriber data, services, or signaling traffic associated with user traffic in the communication network. In a core network a control node may be a MSC, MME (Mobility Management Entity), SGSN (Serving Gateway Support Node), P-CSCF (Proxy Call State Control Function), S-CSCF (Serving-CSCF), or TAS (Telephony Application Server) node.

Within the context of the present application, the term "packet control node" refers to a control node of the packet core network. Examples of packet control node are MME or SGSN.

Within the context of the present application, the term "pool of MSCs", also known as MSC Pool, refers to a group of MSC nodes sharing in parallel the traffic generated from one MSC Pool area. A BSC/RNC node belonging to an MSC Pool area is connected to all the MSC nodes in the related MSC pool. All MSCs within a pool are connected to all BSCs/RNCs. All MSCs within a pool have the same radio access network related settings. An MSC of the pool has no knowledge about the behavior of the surrounding MSC nodes, whether they belong to the same MSC pool or not. The MSC pool concept is mainly applicable for the BSC/RNC, as the BSC/RNC can see a pool of MSC nodes.

It should be understood that although the present application refers to control nodes such as a MSC, or a packet control node such as a MME or SGSN, these control nodes could be implemented as functional units and may not necessarily be located at a fixed place or are not implemented in a dedicated hardware. These control nodes may be implemented "in the cloud" in a Network Function Virtualization (NFV) scenario where the function of the control node is running as a virtual software instance on an all-purpose computing platform in a data center. The NFV concept further allows moving such a virtualized software instance from one computing platform to another, even during running operation, or even to another data center. This concept further allows functionally distributing sub-functions of the control node to different computing platforms, located in the same or even in different data centers.

Referring to FIG. 1, this figure shows a diagram illustrating a system for MSC in Pool 130, where a UE 100 is attached to a MSC of the pool 130 via a packet control node 140 according to the invention.

In this system the MSC Pool 130 comprises three MSC nodes, MSC 1 320, MSC 2 122, and MSC 3 124. So a first MSC corresponds to the MSC 320 while a second MSC corresponds to MSC 2 122 or MSC 3 124.

Three RNC/BSC 110 are depicted as radio access network, where all of the three RNC/BSC 110 are connected to all MSC 320, 122, 124 of the MSC Pool 130 in a full mesh fashion. A UE 100 may attach to an MSC of the MSC Pool 130 via any of these three RNC/BSC 110. Shown is an example where UE 100 is connected to the MSC Pool 130 via RNC/BSC 110. A RNC may use the RANAP protocol to communicate with an MSC 320, 122, 124 of the MSC Pool 130, while a BSC may use BSSAP for that purpose.

By alternative, a UE 100 may use LTE or 4G radio and may in this case be connected to the MSC Pool 130 via a packet control node 140, here shown as MME/SGSN 140. Also all the MME/SGSN 140 are connected to all MSC 320, 122, 124 of the MSC Pool 130 via a fully mesh of connections. Shown is an example where a UE 100 is connected to the MSC Pool 130 via MME/SGSN 140. A MME/SGSN 140 may use the SGsAP protocol to communicate with an MSC 320, 122, 124 of the MSC Pool 130.

The communication network further comprises a HLR, where all subscriber data of the served subscribers are stored. The HLR communicates with any of the MSC 320, 122, 124 of the MSC Pool 130 via the MAP (Mobile Application Part) protocol.

The MME/SGSN 140 may also form a pool of packet control nodes, such that the MME/SGSN 140 may be part of that pool of MME/SGSN. This option is not shown in the figure as this aspect is not relevant in the present application.

Since this figure depicts the general system structure, in real implementations the MSC 320, 122, 124 of the MSC Pool 130 may be functional equivalent, however within the context of the present application it is assumed that the MSC 1 320 supports the additional functionality as of this application. Similarly, the MME/SGSN 140 corresponds to the packet control node 140 and further corresponds to the MME 340 in FIG. 3 or the SGSN 440 in FIG. 4.

If a UE 100 is attached to the MSC Pool 130, for example attached to MSC 1 320, the registration of the UE 100 in MSC 1 320 can be moved to another MSC 122, 124 of the MSC Pool 130 and thereby redistributing the registration of the UE 100 in the MSC Pool 130.

Figure 3:
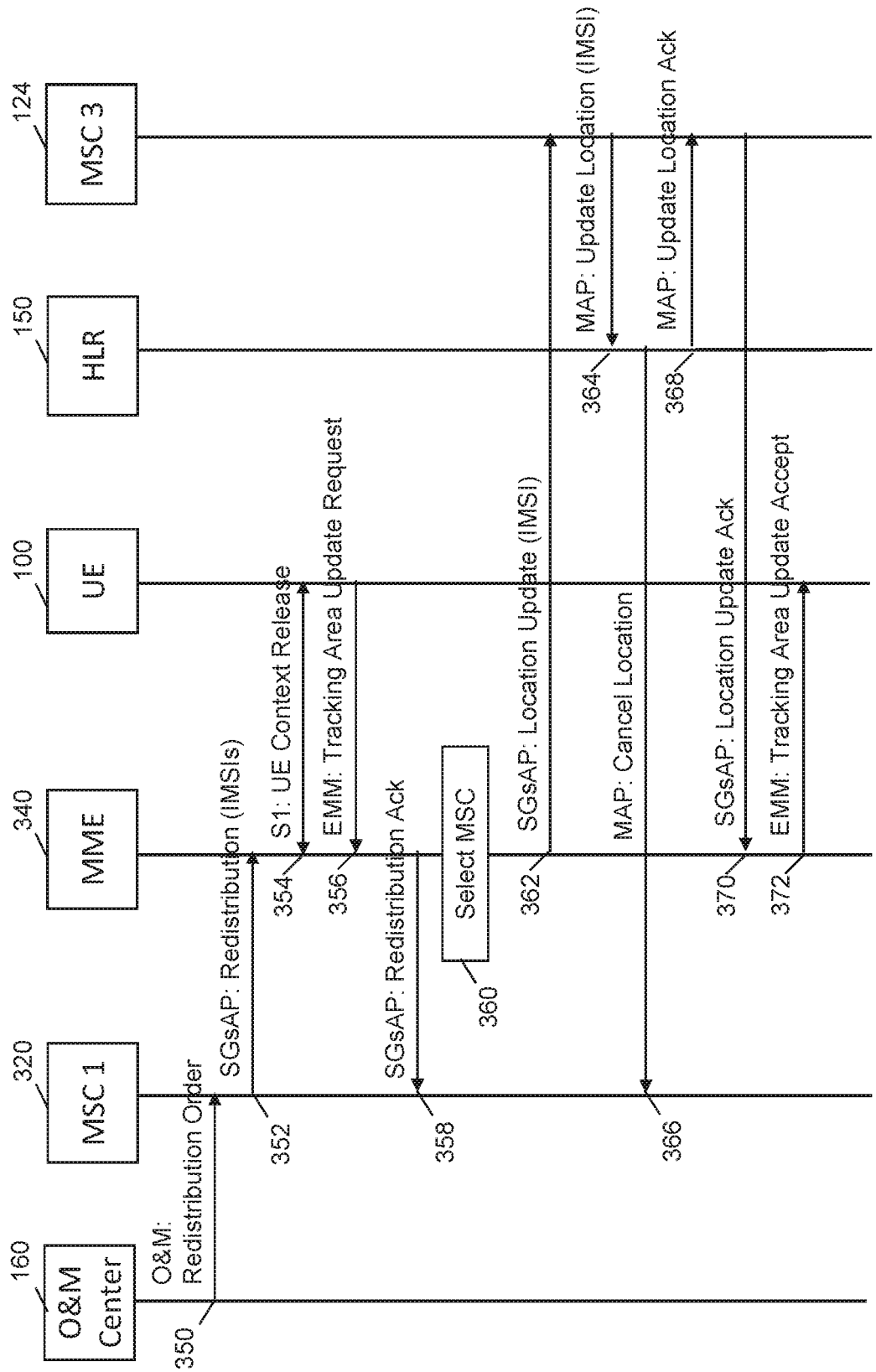
FIG. 3 shows a sequence diagram for redistribution of a UE registration, where the UE is attached to a MSC of the pool via a MME node and SGs-interface according to the invention.

Referring to FIG. 3, this figure shows a sequence diagram for redistribution of a UE 100 registration, where the UE 100 is attached to MSC 1 320 of the MSC pool 130 via a MME 340 node and SGs-interface according to the invention.

The flow starts when the operator orders the redistribution of UE 100 registrations within the MSC Pool 130. The purpose of this redistribution may be to offload a specific MSC 320, 122, 124 of the MSC Pool 130, if for example the traffic load within the pool is unevenly distributed and a particular MSC is higher loaded than the other MSCs of the Pool 130. So the purpose may be to even out the load within the pool 130. The purpose may also be to redistribute the load within the pool 130 in case a new MSC is added into the pool 130, so the new MSC shall receive traffic immediately, reducing the load on the other MSCs in the pool 130. Another purpose may be to remove all UE registrations from a MSC of the pool 130, and redistributing all the UE 100 registrations to the other MSCs of the pool 130. The reason may be to perform maintenance work on the offloaded MSC or even to remove the MSC from the pool. Since all UEs registered in that MSC are redistributed to other MSCs of the pool 130, there is no service interruption for the subscriber. The redistribution order is typically entered in a central O&M Center 160, and the O&M Center 160 sends 350 the corresponding O&M order to the MSC 1 320, from where the UE 100 registrations shall be removed.

The MSC 1 320 receives 350 the O&M order from the O&M Center 160 to redistribute UE 100 registrations within the MSC pool 130. This O&M instruction may contain already at least one registration identity to be redistributed. Typically, such O&M instruction will not contain any registration identity, which leaves the task of selecting UE 100 registrations to be redistributed to the MSC 1 320. The MSC 1 320 may provide different selection algorithms such as random selection, select SGs attached UE 100 registrations only, select Gs attached UE registrations only, all, one specific UE 100 registration, a test UE 100 registrations only, BSC/RNC attached UE registrations, or all UE 100 registrations. The O&M instruction may by alternative provide an identifier of a target MSC, towards which UE registrations shall be redistributed to. In another alternative, or in addition, the O&M instruction may comprise an identifier for a UE registration to be redistributed. Such UE registration identifier may be an IMSI.

After the MSC 1 320 has selected the UE 100 registrations that shall be redistributed, it is assumed here that there is at least one UE 100 registration where the UE 100 is attached to the MSC 1 320 via a MME 340, so via a SGs interface. The MSC 1 320 sends a redistribution order 352 to the MME 340, via which the UE 100 is attached to the MSC 1 320. The redistribution order 352 may be a SGsAP protocol message.

If there are multiple UE 100 registrations attached via MME 340, that shall be redistributed, the different UEs may be attached to the MSC 1 320 via different MMEs. So the redistribution order to the MME 340 may be send in parallel to more than one MME 340, each redistribution order comprising one or many UE 100 registrations identities. A suitable UE 100 registration identity may be for example the IMSI, so the redistribution order 352 from the MSC 1 320 to the MME 340 may comprise a list of IMSIs to be redistributed, wherein all the IMSIs shall be known in the MME 340.

If the O&M instruction provided an identifier of a target MSC, the MSC 1 320 also forwards this target MSC identifier to the MME 340 within the redistribution order 352.

The MME 340 receives the redistribution order 352 from the MSC 1 320. The MME 340 then extracts the IMSIs from that order, and if applicable, the identifier of a target MSC. The following steps are then performed by the MME 340 for each of the comprised IMSIs individually.

The MME 340 triggers the UE 100 to perform a tracking area update procedure. This is done by the MME 340 by sending a S1 message 354 UE Context Release. This causes the UE 100 to release its current packet context with the packet core network. After the packet context is released, the UE 100 initiates an EMM (EPS Mobility Management) message 356 Tracking Area Update Request initiating a tracking area update procedure.

The MME 340 receives the Tracking Area Update Request 356. In case more than one IMSI was provided in the redistribution order 352 from the MSC 1 320, the MME 340 continues to wait until all UEs have responded with a tracking area update procedure. Once all UEs have responded, the MME 340 acknowledges 358 to the requesting MSC 1 320 that all UE 100 registrations redistributions are triggered. This acknowledgement may be a SGsAP message.

The MSC 1 320 receives the acknowledgement 358 that all ordered UE 100 registrations redistributions are triggered.

The MME 340 now triggers the UE to be registered into a new MSC of the pool 130. In step 360 the MME 340 selects a new MSC 122, 124 out of the MSC pool 130 as a new redistribution target. The MME 340 may support different selection algorithms such as random selection, load sharing, round robin, capacity weighted round robin, based on UE type, UE capabilities, subscribed subscriber features, subscriber identity, or subscriber home network.

If an identifier of a target MSC was received within the redistribution order 352 from the MSC 1 320, the selection algorithms simply selects this MSC as redistribution target.

After the new MSC has been selected, in this case MSC 3 124 was selected, the MME 340 sends 362 a Location Update message to the MSC 3 124. Triggering a location area update procedure to the MSC 3 124 is caused by reception of a routing or tracking area update operation from the UE 1. The Location Update message may be a SGsAP message and comprises the IMSI of the UE 100 to be registered.

The MSC 3 124 receives 362 the Location Update message and triggers the standard location update procedure by informing 364 the HLR 150 of the location update. The HLR 150 then cancels 366 the registration in the MSC 1 320, inserts the subscriber data into the MSC 3 124 (not depicted) and acknowledges 368 the location update to the MSC 3 124.

The MSC 3 124 acknowledges 370 the location update to the MME 340 (may be a SGsAP message), which then acknowledges 372 the location update to the UE 100.

Figure 4:
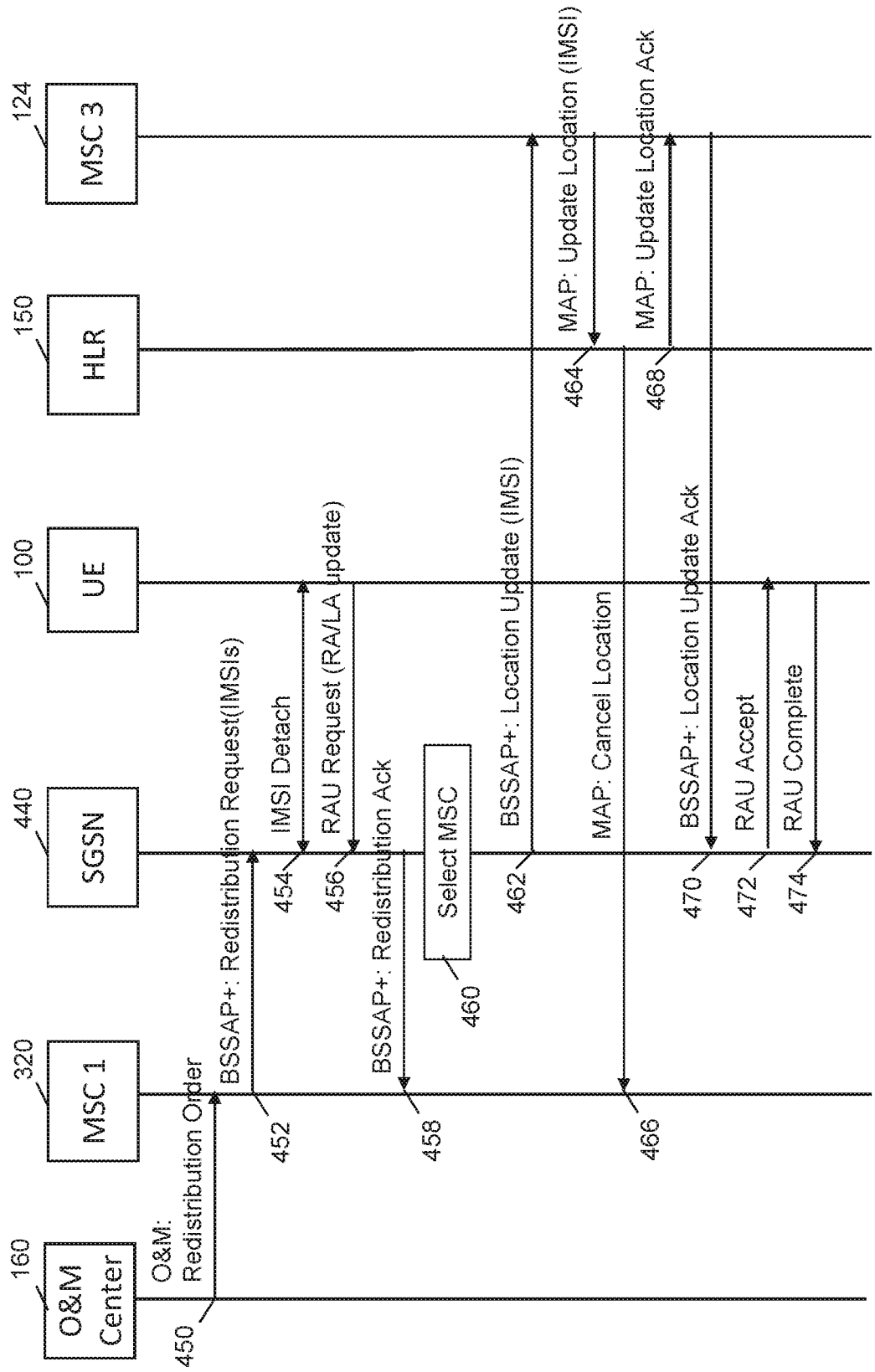
FIG. 4 shows a sequence diagram for redistribution of a UE registration, where the UE is attached to a MSC of the pool via a SGSN node and Gs-interface according to the invention.

Referring to FIG. 4, this figure shows a sequence diagram for redistribution of a UE 100 registration, where the UE 100 is attached to a MSC 320 of the MSC pool 130 via a SGSN 440 node and Gs-interface according to the invention.

The case where the UE 100 is attached to the MSC 320 via a SGSN 440 is very similar to the MME 340 sequence of FIG. 3 and only significant differences are highlighted.

The O&M Center 160 send the redistribution order 450 to the MSC 320. The MSC 320 receives the redistribution order 450. Then the MSC 320 sends a redistribution order 452 to the SGSN 440, via which the UE 100 is attached to the MSC 1 320. The redistribution order 452 may be a BSSAP+ message.

The SGSN 440 instructs 454 the UE 100 to perform an IMSI detach. This triggers the UE 100 to trigger a routing area update procedure by sending 456 a RAU (Routing Area Update) Request message. Then the SGSN 440 acknowledges 458 to the MSC 1 320. This acknowledgement 458 may be BSSAP+ message.

The SGSN 440 then selects 460 the redistribution target MSC, in this case MSC 3 124 and sends 462 a Location Update message to the MSC 3 124. This Location Update message may be a BSSAP+ message.

The MSC 3 124 receives 462 the Location Update message and triggers the standard location update procedure by informing 464 the HLR 150 of the location update. The HLR 150 then cancels 466 the registration in the MSC 1 320, inserts the subscriber data into the MSC 3 124 (not depicted) and acknowledges 468 the location update to the MSC 3 124.

The MSC 3 124 acknowledges 470 the location update to the MME 340 (may be a BSSAP+ message), which then acknowledges 472 the location update to the UE 100. The UE 100 confirms by sending 474 RAU Complete message.

Figure 5:
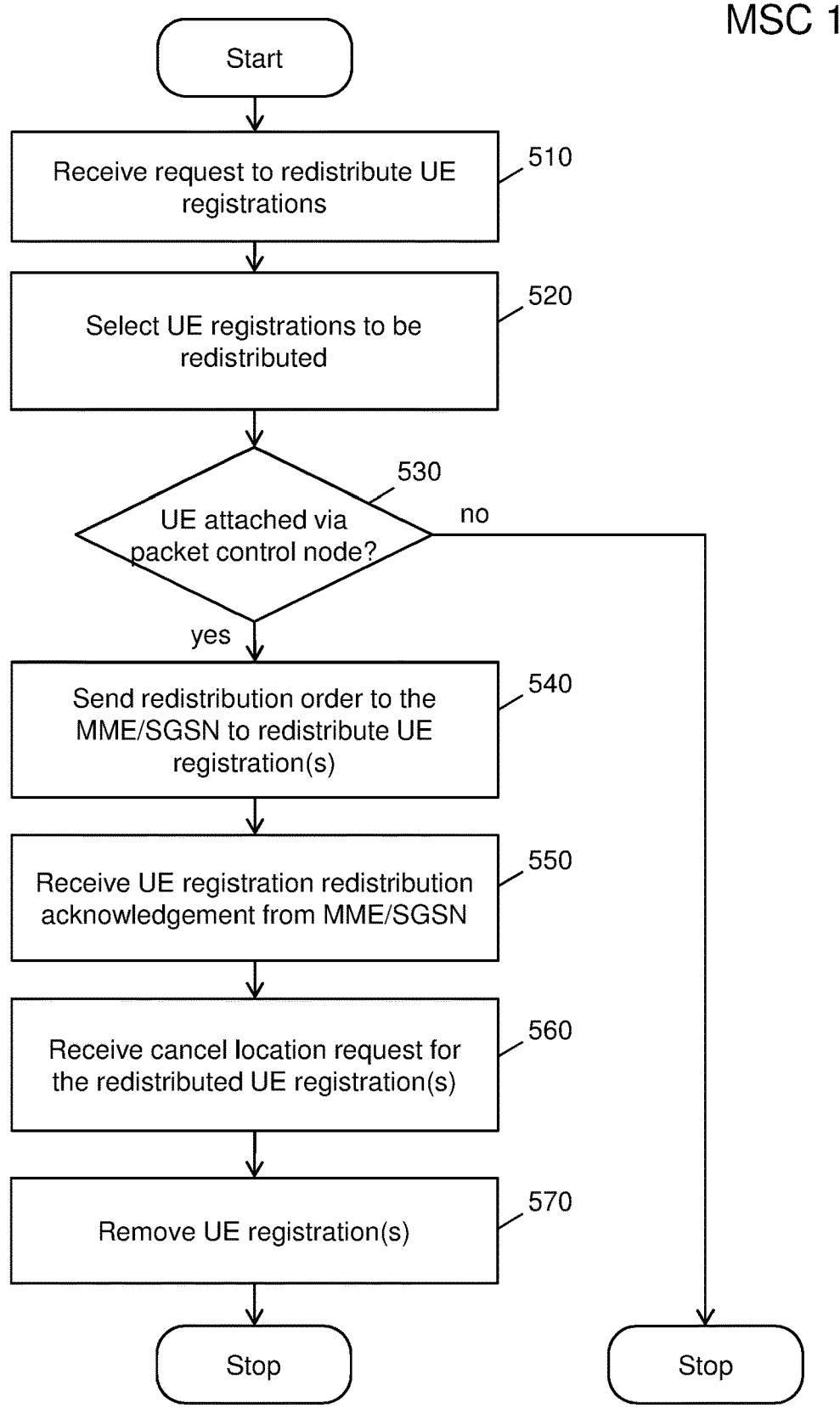
FIG. 5 shows a flow diagram in a MSC acting as first MSC according to the invention.

Referring to FIG. 5, this figure shows a flow diagram in a MSC 320 acting as first MSC according to the invention.

The flow starts in step 510 when the MSC 320 receives a request to redistribute UE registrations. This request may be an O&M order received from an O&M Center 160.

In step 520 the MSC 320 selects the UE registrations that shall be redistributed. Selected may be one or several UE registrations identified by a UE registrations identifier such as the IMSI.

In step 530 the MSC 320 determines whether among the selected UE registrations for redistribution there are UE registrations where the UE is attached to the MSC 320 via a packet control node 140 such as the MME or SGSN. If there are no such UE registrations, the flow stops and the prior art UE registration redistribution is applied.

If in step 530 there is at least one UE registration, where the UE is attached to the MSC 320 via a packet control node 140, the flow continues with step 540.

In step 540 the MSC 320 sends a redistribution order to the packet control node 140. The redistribution order comprises at least one IMSI identifying a UE registration to be redistributed. In addition, this redistribution order may comprise an identifier of a target MSC for redistribution.

In step 550 the MSC 320 receives a UE registration redistribution acknowledgement from the packet control node 140. This acknowledgement confirms that the UE registration redistribution has been triggered by the packet control node 140.

In step 560 the MSC 320 receives a cancel location message from the HLR ordering the MSC 320 to cancel the registration of a UE identified by an IMSI.

The MSC 320 will then in step 570 remove the UE registration from the MSC 320, which completes the UE registration redistribution procedure.

Figure 6:
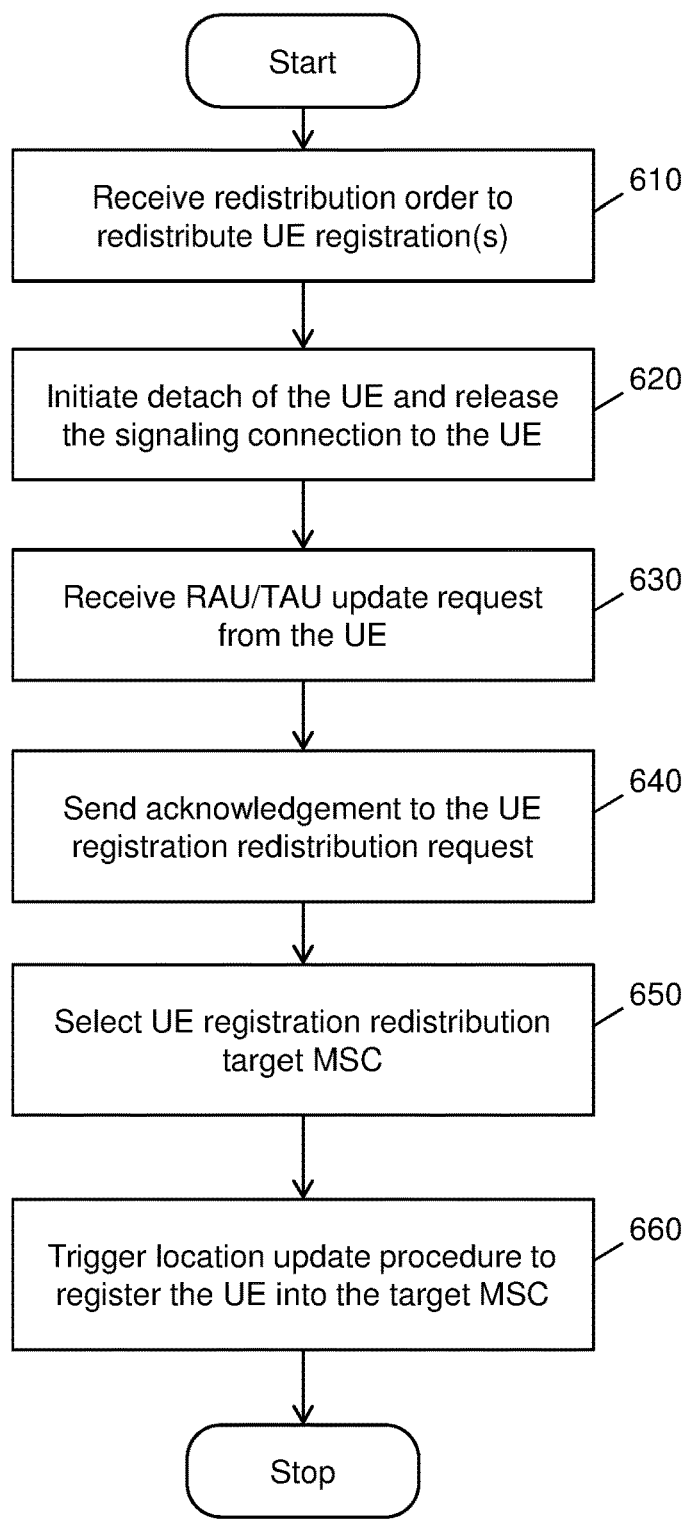
FIG. 6 shows a flow diagram in a packet control node according to the invention.

Referring to FIG. 6, this figure shows a flow diagram in a packet control node 140 according to the invention.

The flow starts in step 610 when packet control node 140 receives a redistribution order for redistributing UE registrations from a MSC. The UE registrations to be redistributed are identified by one or several UE registrations identifier such as the IMSI. In addition, this redistribution order may comprise an identifier of a target MSC for redistribution.

In step 620 the packet control node 140 initiates detach of the UE or the release of the current packet context in the UE. Also the signaling connection to the UE may be released.

This causes the UE to initiate a tracking/routing area update procedure, where in step 630 the packet control node 140 receives the corresponding signaling from the UE.

In step 640 the packet control node 140 acknowledges the triggering of the UE registration redistribution to the requesting MSC.

In step 650 the packet control node 140 selects the target MSC towards which the UE registration shall be redistributed. If a target MSC was received within the redistribution order, this MSC is selected as redistribution target.

In step 660 the packet control node 140 initiates a location update procedure towards the selected target MSC to register the UE into the target MSC, which completes the UE registration redistribution procedure.

Figure 7:
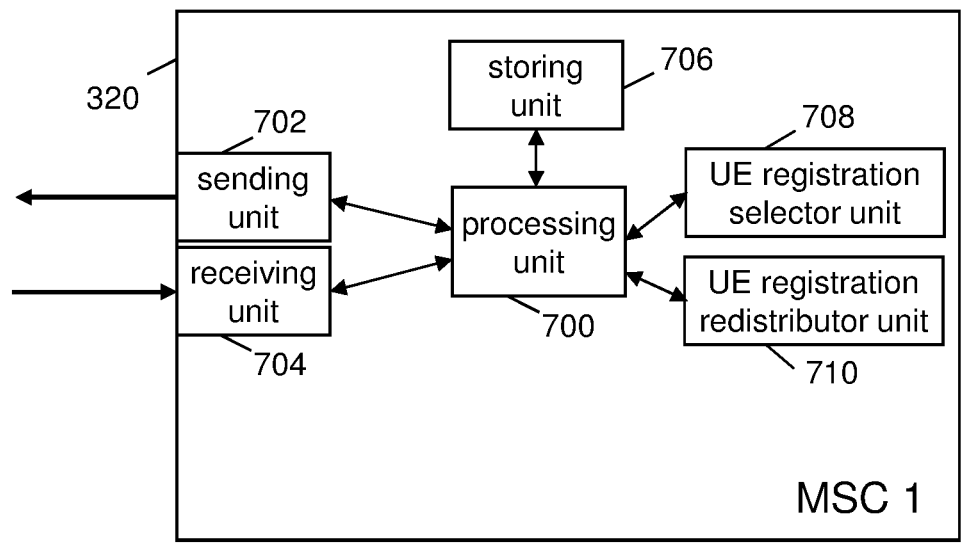
FIG. 7 shows a block diagram illustrating a MSC acting as first MSC according to the invention.

Referring to FIG. 7, this figure shows a block diagram illustrating a MSC acting as first MSC according to an embodiment. The illustrated entity may correspond to the MSC 1 320. The MSC 1 320 may be adapted to perform one or more steps of the above described method shown in FIG. 5.

The MSC 320 may comprise a number of functional units, which are described in further detail below and which are adapted to perform respective method steps.

A processing unit 700 of the MSC 320 may be adapted execute steps for controlling the UE registration redistribution in the MSC pool. In a practical implementation the processing unit 700 may be one processor taking care of all the above functions, or may also be distributed over more than one processor, wherein the functions are distributed over the available processors.

The MSC 320 may further comprise a sending unit 702 and a receiving unit 704 via which the MSC 320 can communicate with other entities of the communication network such as the BSC/RNC 110, the HLR 150, the MME/SGSN 340/440 or the O&M Center 160. The sending unit 702 may send out signaling messages composed by the processing unit 700. The receiving unit 704 may receive signaling messages from those communication network entities above and forward the received signaling messages to the processing unit 700 for handling. The MSC 320 may comprise more than one sending unit and receiving unit for signaling capacity and redundancy reasons.

The MSC 320 may also comprise a storing unit 706 for storing information related to controlling the UE registration redistribution in the MSC pool. The storing unit 706 may comprise various types of memory such as volatile memory, non-volatile memory, hard disk drives, solid state drives, a network interface to a database or a data center, secure digital cards, or hardware such as smart cards, non-reversible chips, security chips, security modules, or trusted platform module devices. The storing unit 706 may be used by the processing unit 700 to store information, for example program code or data related to a UE registration.

The MSC 320 may also comprise a UE registration selector unit 708 for selecting the UE registrations out of the stored UE registrations that shall be subject to UE registration redistribution. The UE registration selector unit 708 may be adapted to perform different selectable selection algorithms such as random selection, all SGs attached UE registrations, all Gs attached UE registrations, all, one specific UE registration, test UE registrations only, BSC/RNC attached UE registrations, or all UE registrations.

The MSC 320 may further comprise a UE registration redistribution unit 710 for coordinating the UE registration redistribution, such as segmenting the UE registration redistribution into manageable batches of UE registration, if a larger number of UE registrations shall be redistributed. A manageable batch may be given by the number of UE registration identities that can be packed into one redistribution order message from the MSC 320 to the MME/SGSN 340/440. The next batch may be initiated by the UE registration redistribution unit 710 after a UE registration redistribution acknowledgement has been received from the MME/SGSN 340/440.

Figure 8:
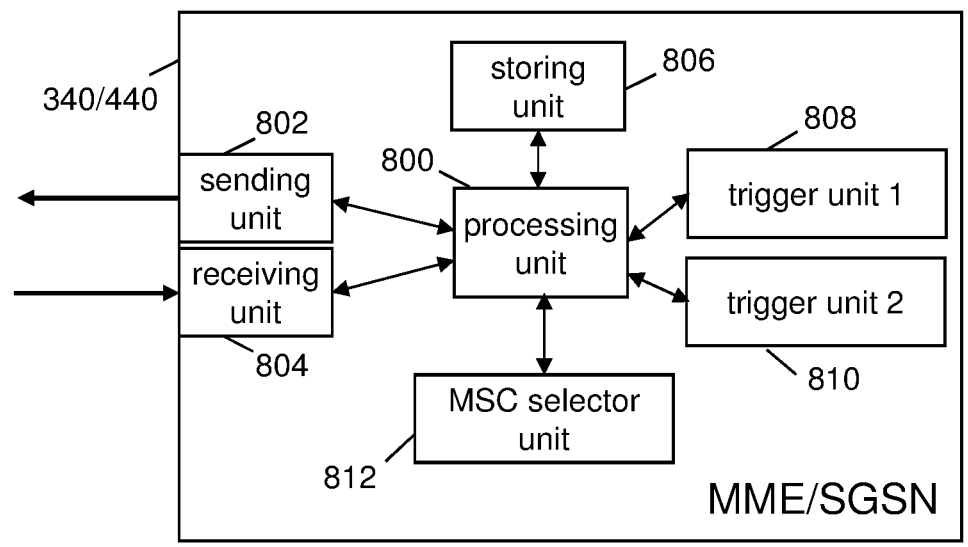
FIG. 8 shows a block diagram illustrating a packet control node according to the invention.

Referring to FIG. 8, this figure shows a block diagram illustrating a packet control node according to an embodiment. The illustrated entity may correspond to the packet control node such as MME/SGSN 340/440. The 340/440 may be adapted to perform one or more steps of the above described method shown in FIG. 6.

The MME/SGSN 340/440 may comprise a number of functional units, which are described in further detail below and which are adapted to perform respective method steps.

A processing unit 800 of the MME/SGSN 340/440 may be adapted to execute steps for controlling the UE registration redistribution in the MSC pool. In a practical implementation the processing unit 800 may be one processor taking care of all the above functions, or may also be distributed over more than one processor, wherein the functions are distributed over the available processors.

The MME/SGSN 340/440 may further comprise a sending unit 802 and a receiving unit 804 via which the MME/SGSN 340/440 can communicate with other entities such as the UE 100, or the MSC 320. The sending unit 802 may send out signaling messages composed by the processing unit 800. The receiving unit 804 may receive signaling messages from those entities above and forward the received signaling messages to the processing unit 800 for handling. The MME/SGSN 340/440 may comprise more than one sending unit and receiving unit for signaling capacity and redundancy reasons.

The MME/SGSN 340/440 may also comprise a storing unit 806 for storing information related to controlling the UE 100 registration redistribution in the MSC pool. The storing unit 806 may comprise various types of memory such as volatile memory, non-volatile memory, hard disk drives, solid state drives, a network interface to a database or a data center, secure digital cards, or hardware such as smart cards, non-reversible chips, security chips, security modules, or trusted platform module devices. The storing unit 806 may be used by the processing unit 800 to store information, for example program code or data related to a UE packet registration.

The MME/SGSN 340/440 may also comprise a first trigger unit 808 adapted to trigger the UE 100 to perform a routing or tracking area update procedure.

The MME/SGSN 340/440 may further comprise a second trigger unit 810 adapted to trigger the UE 100 to be registered to the second MSC 120.

The MME/SGSN 340/440 may also comprise a MSC selector unit 812 adapted to select the target MSC 120 out of the MSCs in the pool to which the UE 100 registration shall be redistributed. The MSC selector unit 812 may be adapted to perform different selectable selection algorithms such as random selection, load sharing, round robin, capacity weighted round robin, based on UE type, UE capabilities, subscribed subscriber features, subscriber identity, or subscriber home network.

According to another embodiment, a computer program is provided. The computer program may be executed by the processing units 700 and/or 800 of the above mentioned entities 320 and/or 340/440 respectively such that a method for UE registration redistribution function in a MSC pool, taking also into account UEs attached via SGs/Gs-interface as described above with reference to FIG. 5 or 6 may be carried out or be controlled. In particular, the entities 320 and/or 340/440 may be caused to operate in accordance with the above described method by executing the computer program.

The computer program may be embodied as computer code, for example of a computer program product. The computer program product may be stored on a computer readable medium, for example a disk or the storing unit 706 and/or 806 of the entities 320 and/or 340/440, or may be configured as downloadable information.

One or more embodiments as described above may enable at least one of the following technical effects:
- It is possible to redistribute all UE registrations in a MSC to other MSCs of the pool.
- The UE registration redistribution function is fully functional also for subscribers attached to a MSC of the pool via a MME/SGSN.
- Efficient bulk redistribution of UE registrations by providing a list of UE registration identifiers in the redistribution order from the MSC to the MME/SGSN.

Modifications and other embodiments of the disclosed invention will come to mind to one skilled in the art having the benefit of the teachings presented in the foregoing descriptions and the associated drawings. Therefore, it is to be understood that the embodiments are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method implemented in a first MSC for redistributing a registration of a user equipment from a first MSC to a second MSC, wherein the first MSC and the second MSC are members of a pool of MSCs, the user equipment being registered in the first MSC and being attached to the first MSC via a packet control node, the method comprising:
    receiving an instruction to redistribute user equipment registrations;
    selecting the user equipment registrations to be redistributed; and
    sending a redistribution order to the packet control node, wherein an acknowledgment from the packet control node confirms triggering of the redistribution of the user equipment registration.

2. The method of claim 1, wherein the instruction to redistribute user equipment registrations is received from an operation and maintenance center.

3. The method of claim 1, wherein the redistribution order comprises at least one identifier of a user equipment registration to be redistributed.

4. The method of claim 1 wherein selecting the user equipment registrations to be redistributed comprises selecting the user equipment registrations to be redistributed based on a type of interface connecting the user equipment to the first MSC.

5. A method in a packet control node for redistributing a registration of a user equipment from a first MSC to a second MSC, wherein the first MSC and the second MSC are members of a pool of MSCs, the user equipment being registered in the first MSC and being attached to the first MSC via the packet control node, the method comprising:
    receiving, from the first MSC, a redistribution order to redistribute the registration of the user equipment;
    triggering the user equipment to perform a routing or tracking area update procedure;
    triggering the user equipment to be registered to the second MSC; and
    acknowledging, to the first MSC, the triggering the redistribution of the user equipment registration.

6. The method of claim 5, wherein the redistribution order comprises at least one identifier of a user equipment registration to be redistributed.

7. The method of claim 5, wherein triggering the user equipment to perform a routing or tracking area update procedure comprises sending a detach instruction to the user equipment.

8. The method of claim 5, wherein triggering the user equipment to perform a routing or tracking area update procedure comprises releasing the signaling connection to the user equipment.

9. The method of claim 5, wherein triggering the user equipment to be registered to the second MSC comprises triggering a location area update procedure to the second MSC, and thereby causing the user equipment to be registered to the second MSC.

10. The method of claim 9, wherein triggering a location area update procedure to the second MSC is caused by a reception of a routing or tracking area update operation from the user equipment.

11. The method of claim 9, wherein triggering a location area update procedure to the second MSC causes the packet control node to select the second MSC from the pool of MSCs.

12. The method of claim 11, wherein the packet control node applies a load sharing algorithm to select the second MSC from the pool of MSCs.

13. A first MSC for redistributing a registration of a user equipment from the first MSC to a second MSC, wherein the first MSC and the second MSC are members of a pool of MSCs, the user equipment being registered in the first MSC and being attached to the first MSC via a packet control node, the first MSC comprising:
  memory configured to store instructions; and
  processing circuitry configured to execute the instructions to:
    receive an instruction to redistribute user equipment registrations;
    select user equipment registrations for redistribution; and
    send a redistribution order to the packet control node to redistribute the selected user equipment, wherein an acknowledgment from the packet control node confirms triggering of the redistribution of the user equipment registration.

14. The first MSC of claim 13, wherein the instruction to redistribute user equipment registrations is received from an operation and maintenance center.

15. The first MSC of claim 13, wherein the redistribution order comprises at least one identifier of a user equipment registration to be redistributed.

16. The first MSC according to claim 13, wherein the processing circuitry is further configured to handle the redistribution of user equipment registrations.

17. A computer program product for redistributing a registration of a user equipment from a first MSC to a second MSC, wherein the first MSC and the second MSC are members of a pool of MSCs, the user equipment being registered in the first MSC and being attached to the first MSC via a packet control node, the computer program product stored on a non-transitory, computer readable medium and comprising program instructions, which when executed by at least one processor at the first MSC, causes the at least one processor to:
  receive an instruction to redistribute user equipment registrations;
  select user equipment registrations for redistribution; and
  send a redistribution order to the packet control node, wherein an acknowledgment from the packet control node confirms triggering of the redistribution of the user equipment registration.

18. A computer program product, for redistributing a registration of a user equipment from a first MSC to a second MSC, wherein the first MSC and the second MSC are members of a pool of MSCs, the user equipment being registered in the first MSC and being attached to the first MSC via the packet control node, the computer program product stored on a non-transitory, computer readable medium and comprising program instructions, which when executed by at least one processor, causes the at least one processor to:
  receive, from the first MSC, a redistribution order to redistribute the registration of the user equipment;
  trigger the user equipment to perform a routing or tracking area update procedure; and
  trigger the user equipment to be registered to the second MSC; and
  acknowledging, to the first MSC, the triggering the redistribution of the user equipment registration.

19. A method in a User Equipment (UE) for redistributing a registration of the UE from a first MSC to a second MSC, wherein the first MSC and the second MSC are members of a pool of MSCs, and wherein the UE is registered in the first MSC and is attached to the first MSC via a packet control node, the method comprising:
  receiving a registration redistribution message from the packet control node, wherein the registration redistribution message triggers the UE to deregister from the first MSC and register with the second MSC;
  performing a routing or tracking area update procedure to register with the second MSC responsive to receiving the registration redistribution message; and
  receiving, from the packet control node, a Tracking Area Update Accept message acknowledging a location update operation performed by the second MSC to register the UE with the second MSC.

20. The method of claim 19 wherein the registration redistribution message comprises a UE Context Release message.

21. The method of claim 19 wherein performing a routing or tracking area update procedure comprises sending an Tracking Area Update Request message to the packet control node.

22. The method of claim 19 wherein the registration redistribution message comprises IMSI Detach message.

23. The method of claim 19 wherein performing a routing or tracking area update procedure comprises sending a Routing Area Update (RAU) Request message to the packet control node.

24. The method of claim 19 further comprising:
  receiving, from the packet control node, an RAU Accept message acknowledging a location update operation performed by the second MSC to register the UE with the second MSC; and
  sending an RAU Complete message to the packet control node confirming the receipt of the RAU Accept message.

* * * * *